May 28, 1946.　　　　J. D. ROVICK　　　　2,401,192
MACHINE ELEMENT
Filed Jan. 1, 1943

Inventor:
John D. Rovick
By: Edward C. Gritzbaugh
Atty.

Patented May 28, 1946

2,401,192

UNITED STATES PATENT OFFICE 2,401,192

MACHINE ELEMENT

John D. Rovick, Muncie, Ind., assignor to Borg-Warner Corporation, Chicago, Ill., a corporation of Illinois Application January 1, 1943, Serial No. 471,088

16 Claims. (Cl. 308—210)

This invention relates to a slidably mounted torque-transmitting machine element and particularly to a mounting means therefor.

It is sometimes found necessary in the design of a torque-transmitting mechanism wherein the torque is to be interrupted or reversed to utilize axially spaced torque-transmitting and torque-receiving elements and a rotatable, relatively long connecting element which is slidably mounted so that in one position it connects the torque-transmitting and receiving elements and in another position the connection is broken. One instance of such a construction may be found in the idler gear for a truck transmission wherein the idler is relatively long and is slidably and rotatably mounted on an idler shaft so that in one position it contacts only the torque-transmitting gear, for example, the countershaft gear, and in another position it maintains the contact with the torque-transmitting gear and establishes contact with a torque-receiving gear on the driven shaft.

It will be noted in the example just described that due to the fact that the torque is transmitted to the idler gear tangentially at one end and is transmitted from the idler gear to the countershaft tangentially at its other end an unbalanced condition is present which tends to throw the idler gear out of alignment with respect to its shaft and possibly with respect to the teeth of the driving and driven gears. For better efficiency it is desirable to use anti-friction bearings between the idler gear and its shaft, but since the gear must be slidable on its shaft, the close fit usually employed in such bearings cannot be used here. This results in a certain amount of play between the anti-friction bearing and the gear and shaft, and there is no safeguard against the misalignment of the gear when it is transmitting torque.

As a result of the conditions above described it has been found that such an idler will have a tendency to creep out of mesh while transmitting torque, this tendency probably being the result of the twisting of the rollers relative to the shaft, which produces an axial component tending to move the gear toward disengaged position.

The principal object of this invention is to provide a mounting means for a machine element which is adapted to rotate and slide on a shaft, which mounting will minimize the tendency of the element to creep along its shaft under normal working conditions.

Another object of this invention is to provide a mounting means for a relatively long gear which is adapted to transmit and receive torque tangentially at opposite ends thereof which mounting will prevent undue misalignment between the gear and shaft under ordinary operating conditions but which nevertheless will not impede the axial movement of the gear along its shaft.

A more specific object of this invention is to provide a mounting for a rotatable and slidable machine element which will have an anti-friction bearing to reduce rotational friction and which will also have a means for maintaining the anti-friction bearing in alignment while in operation.

These and other objects and features of the invention will become apparent from the following detailed description when taken together with the accompanying drawing in which.

Figure 1:
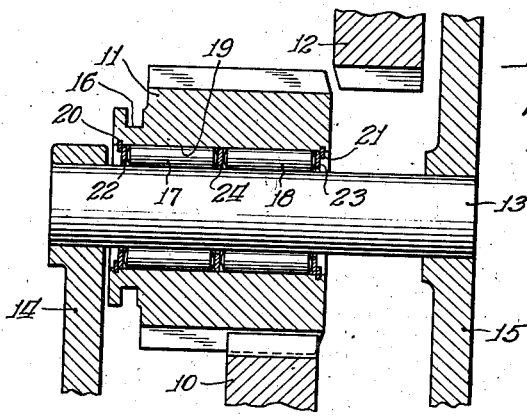
Fig. 1 is a fragmentary portion of a gear-type power transmission including an idler gear which has been found to creep out of mesh.

Referring now to Fig. 1 wherein is shown a design of sliding gear and mounting means therefor which has been found to creep when in operation, a driving gear is shown fragmentarily at 10 meshing with an idler gear 11 which is shown in a disconnected condition relative to a driven gear 12, the latter likewise being shown fragmentarily. Idler 11 is mounted on a shaft 13 which is supported between a bracket 14 and a wall 15 of a casing or housing for the transmission.

Idler 11 is sufficiently long so that when it is slid to the right (Fig. 1) it will contact and mesh with gear 12 while maintaining a drive-receiving connection with gear 10. The control for idler 11 is effected through a groove 16 into which may fit a shift fork (not shown) of any suitable character.

Intermediate idler gear 11 and shaft 13 are two sets of rollers 17 and 18 which serve as anti-friction bearings for the gear. Said rollers contact inner surface 19 of the central opening in gear 11 and also contact directly shaft 13. The rollers are maintained in place by means of snap rings 20 and 21 against which bear washers 22 and 23 respectively. A central washer 24 serves to separate the two sets of rollers.

Figure 2:
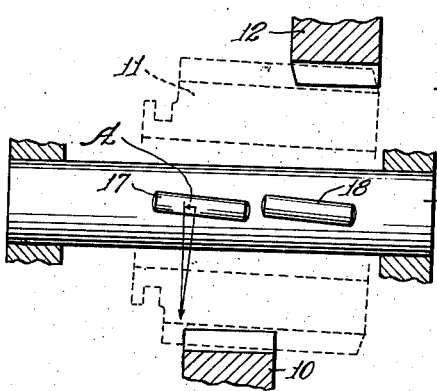
Fig. 2 is a diagrammatic representation of the forces present under ordinary working conditions in a construction such as illustrated in Fig. 1.

It will be apparent that in order to permit easy shifting of idler 11 along shaft 13 the tolerances between gear 11, rollers 17 and 18 and shaft 13 must be sufficiently large to avoid creating too much resistance to such axial movement of the gear. This freedom of movement however, results in an undesirable condition which is shown in Fig. 2. It will be observed that in the position shown in that figure, idler gear 11 is in mesh with gears 10 and 12 and since the last-mentioned gears are axially spaced from one another the torque is impressed upon and transmitted from gear 11 at opposite ends of the gear and in a manner to cause the gear to assume a misaligned position relative to its shaft 13. The misalignment is possible because of the loose fit of the gear on its rollers 17 and 18. When so misaligned, there is a tendency for rollers 17 and 18 likewise to become misaligned and they assume the position shown in Fig. 2. It will be apparent that the misaligned rollers will have an axial component of force A tending to move them and the associated gear 11 back to the position shown in Fig. 1. Actual tests have shown that such a movement does occur and that idler gear 11 eventually becomes disengaged from gear 12 without the operator desiring such action.

Figure 3:
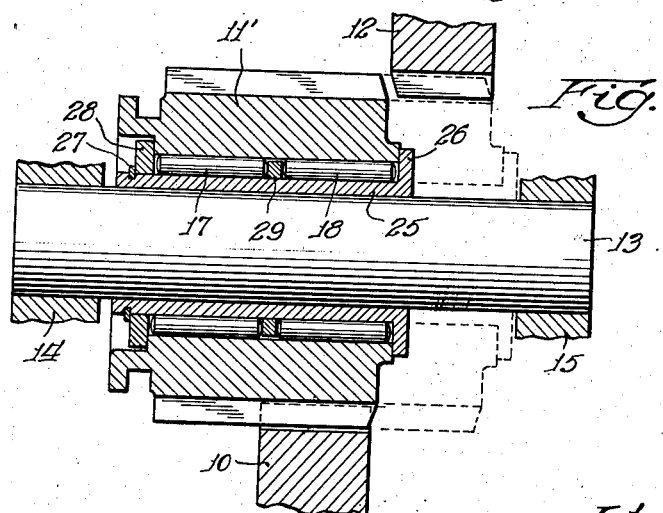
Fig. 3 shows a preferred embodiment of this invention as incorporated in the transmission of Fig. 1 to correct the undesirable conditions therein.

It has been found that the tendency to creep out of mesh may be eliminated by the simple expedient shown in Fig. 3. It will be observed that the rollers 17 and 18 and their desirable anti-friction characteristics are retained but that a bushing 25 has been inserted between rollers 17 and 18 and shaft 13. The bushing is provided with a flange 26 which contacts the right hand end (Fig. 3) of gear 11' and with a snap ring 27 and retaining washer 28 at the opposite end of gear 11'. Thus movement of gear 11' along shaft 13 results in a similar movement of bushing 25. The flange 26 and washer 28 assist materially in keeping the gear 11' and bushing 25 aligned. A ring 29 is used between the sets of rollers to keep them separated. It will be observed that since no axial sliding action is required between the rollers 17 and 18 and bushing 25 the tolerances between the rollers and gear 11' and bushing 25 need be made no greater than normal. This means that there will be little play between gear 11' and bushing 25 and hence there will be a considerably reduced tendency to skew the gear relative to its support. For this reason rollers 17 and 18 will roll substantially true and there will be no axial component of force developed during the transmission of torque to cause the gear to move to disengaged position. Since bushing 25 is quite long it will have little or no tendency to assume a misaligned position and hence bushing 25 will not contribute to the creeping tendency.

Thus the improved form shown in Fig. 3 results in a more rigid construction which eliminates misalignment between the gear and its supporting shaft and hence eliminates any tendency to creep out of mesh. It is apparent that this solution to the problem may be utilized not only in the illustrative transmission shown in Figs. 1, 2 and 3 but may be used wherever torque is to be transmitted through a rotating body which is both slidably and rotatably mounted and which incorporates anti-friction rollers. It is understood therefore that the scope of this invention is not to be limited to the embodiment shown herein but is to be determined by the appended claims.

I claim:

1. A mounting for a slidable machine element adapted to receive torque substantially tangentially at one end and deliver said torque at its other end, said mounting comprising a plurality of axially spaced sets of rollers for supporting the element, a bushing for supporting the rollers and a shaft for supporting the bushing, the tolerances between the rollers and the element and bushing accommodating pure rolling only and the tolerance between the bushing and shaft accommodating axial shifting of the element on the shaft.

2. A mounting for a slidable machine element adapted to receive torque substantially tangentially at one end and to deliver said torque at its other end, said mounting comprising a plurality of axially spaced sets of rollers for supporting the element, a bushing for supporting the rollers, said bushing being coextensive with the element and provided with means for substantially preventing misalignment between the element and bushing, and a shaft for supporting the bushing, the tolerances between the rollers and the element and bushing accommodating pure rolling only, and the tolerance between the bushing and shaft accommodating axial shifting of the element on the shaft.

3. A mounting for a slidable machine element adapted to receive torque substantially tangentially on one end and to deliver said torque at its other end, said mounting comprising a plurality of axially spaced sets of rollers for supporting the element, a bushing for supporting the rollers, said bushing being coextensive with the element and provided with means for substantially preventing misalignment between the element and bushing, and a shaft for supporting the bushing, the tolerances between the rollers and the element and bushing accommodating pure rolling only, and the tolerance between the bushing and shaft accommodating rotation and axial shifting of the element on the shaft.

4. A mounting for a slidable machine element adapted to receive torque substantially tangentially at one end and to deliver said torque at its other end, said mounting comprising a plurality of axially spaced sets of rollers for supporting the element, a bushing for supporting the rollers, said bushing being provided with a flange at one end contacting the element and a washer and retaining ring at the other end likewise contacting the element, and a shaft supporting the bushing, the tolerances between the rollers and the element and bushing accommodating pure rolling only, and the tolerance between the bushing and shaft accommodating axial shifting of the element on the shaft.

5. A mounting for a slidable machine element as described in claim 4, the tolerance between the bushing and shaft accommodating rotation as well as said axial shifting of the element of the shaft.

6. A mounting for a slidable idler gear adapted to be in constant mesh with one gear and slidable into mesh with another gear, said mounting comprising rollers for supporting the gear, a bushing for supporting the rollers, a casing, a bracket in the casing, a shaft for supporting the bushing, said shaft being mounted in the casing and bracket, the tolerances between the rollers and the gear and bushing accommodating pure rolling only, and the tolerance between the bushing and shaft accommodating axial shifting of the gear on the shaft.

7. A mounting for a slidable machine element adapted to receive torque substantially tangentially at one end and to deliver said torque at its other end, said mounting comprising rollers for supporting the element, a bushing for supporting the rollers and a shaft for supporting the bushing, the tolerances between the rollers and the element and bushing accommodating pure rolling only, and the tolerance between the bushing and shaft accommodating axial shifting of the element on the shaft, said bushing being coextensive with the element and provided with means for substantially preventing misalignment between the element and bushing.

8. A mounting for a slidable machine element adapted to receive torque substantially tangentially at one end and to deliver said torque at its other end, said mounting comprising rollers for supporting the element, a bushing for supporting the rollers and a shaft for supporting the bushing, the tolerances between the rollers and the element and bushing accommodating pure rolling only, and the tolerance between the bushing and shaft accommodating axial shifting of the element on the shaft, said bushing being coextensive with the element and provided with a flange at one end contacting the element and with a washer and a retaining ring contacting the element at the other end thereof.

9. In combination, a slidable machine element, means for applying torque substantially tangentially to said element adjacent one of its ends, means for receiving torque substantially tangentially from said element adjacent its other end, and a mounting for said element, said mounting comprising rollers for supporting the element, a bushing for supporting the rollers and a shaft for supporting the bushing, the tolerances between the rollers and the element and bushing accommodating pure rolling only, and the tolerance between the bushing and shaft accommodating axial shifting of the bushing on the shaft.

10. In the combination described in claim 9, said bushing being provided with means for preventing relative axial movement between the bushing and element.

11. In combination, a slidable machine element, means for applying torque substantially tangentially to said element adjacent one of its ends, means for receiving torque substantially tangentially from said element adjacent its other end, and a mounting for said element, said mounting comprising rollers for supporting the element, a bushing for supporting the rollers, said bushing being coextensive with the element and provided with means for substantially preventing misalignment between the element and bushing, and a shaft for supporting the bushing, the tolerances between the rollers and the element and bushing accommodating pure rolling only, and the tolerance between the bushing and shaft accommodating axial shifting of the bushing on the shaft.

12. In an idler gear assembly, the combination of an idler gear adapted to be in mesh with a driving gear adjacent one of the ends of the idler gear and to be in mesh with a driven gear adjacent the other end of the idler gear, and a mounting for said idler gear, said mounting comprising rollers for supporting the idler gear, a bushing for supporting the rollers and a shaft for supporting the bushing, the tolerances between the rollers and the idler gear and bushing accommodating pure rolling only, and the tolerance between the bushing and shaft accommodating axial shifting of the bushing on the shaft.

13. In combination, a rotatable element, a shaft, and a mounting for the element which permits the element to rotate about and be shifted axially along said shaft, said mounting comprising rollers for supporting the element and a bushing for supporting the rollers, said bushing being carried by said shaft and being axially slidable thereon.

14. In combination, a rotatable gear element, a shaft, and a mounting for the gear element which permits the element to rotate about and be shifted axially along said shaft, said mounting comprising rollers for supporting the gear element for substantially pure rolling movement only and a bushing for supporting the rollers and being provided with means for preventing misalignment between itself and the gear element, said bushing being carried by said shaft and being axially slidable thereon.

15. In combination, a rotatable element, a shaft, and a mounting for the element which permits the element to rotate about and be shifted axially along said shaft, said mounting comprising rollers for supporting the element and a bushing for supporting the rollers, said bushing being carried by said shaft, the tolerance between the rollers and the element and bushing accommodating substantially pure rolling movement only and the tolerance between the bushing and shaft accommodating axial shifting of the bushing on the shaft.

16. In an idler gear assembly, the combination of an idler gear and a mounting for said idler gear, said mounting comprising rollers for supporting the idler gear, a bushing for supporting the rollers and a shaft for supporting the bushing, the tolerances between the rollers and the idler gear and the bushing accommodating substantially pure rolling movement only and the tolerance between the bushing and shaft accommodating axial shifting of the bushing on the shaft.

JOHN D. ROVICK.